(12) United States Patent
Moeskjaer

(10) Patent No.: US 11,448,196 B2
(45) Date of Patent: Sep. 20, 2022

(54) AXIALLY MOUNTED BEARING HOUSING AND A WIND TURBINE WITH THE AXIALLY MOUNTED BEARING HOUSING

(71) Applicant: SIEMENS GAMESA RENEWABLE ENERGY A/S, Brande (DK)

(72) Inventor: Martin Moeskjaer, Orlando, FL (US)

(73) Assignee: SIEMENS GAMESA RENEWABLE ENERGY A/S

( * ) Notice: Subject to any disclaimer, the term of this patent is extended or adjusted under 35 U.S.C. 154(b) by 483 days.

(21) Appl. No.: 16/481,861

(22) PCT Filed: Dec. 13, 2017

(86) PCT No.: PCT/EP2017/082500
§ 371 (c)(1),
(2) Date: Jul. 30, 2019

(87) PCT Pub. No.: WO2018/141448
PCT Pub. Date: Aug. 9, 2018

(65) Prior Publication Data
US 2019/0376494 A1    Dec. 12, 2019

(30) Foreign Application Priority Data

Jan. 31, 2017  (DE) .................... 10 2017 101 844.1

(51) Int. Cl.
*F03D 80/70*   (2016.01)
*F16C 23/08*   (2006.01)
(Continued)

(52) U.S. Cl.
CPC ............ *F03D 80/70* (2016.05); *F16C 23/086* (2013.01); *F05B 2240/52* (2013.01);
(Continued)

(58) Field of Classification Search
CPC ...... F03D 80/70; F16C 23/086; F16C 35/047; F16C 35/077; F16C 2360/31; F05B 2240/52
(Continued)

(56) References Cited

U.S. PATENT DOCUMENTS 6,232,673 B1    5/2001   Schoo et al.
2006/0153675 A1    7/2006   Rogall et al.
(Continued)

FOREIGN PATENT DOCUMENTS

CN    101903651 A    12/2010
CN    102182644 A    9/2011
(Continued)

OTHER PUBLICATIONS

International Search Report & Written Opinion dated Apr. 11, 2018 for Application No. PCT/EP2017/082500.
(Continued)

*Primary Examiner* — Charles Reid, Jr.
(74) *Attorney, Agent, or Firm* — Schmeiser, Olsen & Watts LLP

(57) ABSTRACT

A bearing housing for use in a wind turbine is provided. Further, the bearing housing is axially coupled to a base support structure using plurality of fastening points on the bearing housing. The bearing housing may be coupled to the base support structure at multiple points so that the load is distributed evenly to the support structures such as base plate and the tower. The bearing housing is coupled to the base support structure using a fastener. The horizontal central axis of the bearing housing coincides with the horizontal central axis of the base support structure.

7 Claims, 3 Drawing Sheets

(51) Int. Cl.
 *F16C 35/04* (2006.01)
 *F16C 35/077* (2006.01)

(52) U.S. Cl.
 CPC .......... *F16C 35/047* (2013.01); *F16C 35/077* (2013.01); *F16C 2360/31* (2013.01)

(58) Field of Classification Search
 USPC ..................................... 384/549; 290/44, 55
 See application file for complete search history.

(56) References Cited

U.S. PATENT DOCUMENTS

| | | |
|---|---|---|
| 2008/0207389 A1 | 8/2008 | Fahrenbach et al. |
| 2010/0026005 A1 | 2/2010 | Nickel et al. |
| 2011/0142598 A1 | 6/2011 | Andersen et al. |
| 2012/0068460 A1 | 3/2012 | Wadehn |
| 2012/0206131 A1* | 8/2012 | Takei .................... F16C 41/007 324/207.25 |
| 2013/0270837 A1 | 10/2013 | Mongeau et al. |

FOREIGN PATENT DOCUMENTS

| | | |
|---|---|---|
| CN | 203272023 U | 11/2013 |
| DE | 10351524 A1 | 8/2004 |
| EP | 1045139 A2 | 10/2000 |
| EP | 1961958 A2 | 8/2008 |
| EP | 2508859 A1 | 10/2012 |
| WO | 2012052022 A1 | 4/2012 |
| WO | WO 2012052022 A1 | 4/2012 |
| WO | WO 2016188556 A1 | 12/2016 |

OTHER PUBLICATIONS

Communication pursuant to Article 94(3) EPC dated Jul. 13, 2020 for Application No. 17 829 620.8.

* cited by examiner

AXIALLY MOUNTED BEARING HOUSING AND A WIND TURBINE WITH THE AXIALLY MOUNTED BEARING HOUSING

CROSS-REFERENCE TO RELATED APPLICATIONS

This application claims priority to PCT Application No. PCT/EP2017/082500, having a filing date of Dec. 13, 2017, which is based on German Application No. 10 2017 101 844.1, having a filing date of Jan. 31, 2017, the entire contents both of which are hereby incorporated by reference.

FIELD OF TECHNOLOGY

This following relates to a rotor of a wind turbine assembly. More particularly, the following relates to a novel method of mounting a bearing in a rotor of the wind turbine.

BACKGROUND

Wind turbines provide a reliable source of renewable energy which is quickly gaining traction among the nations. Wind turbine provides a source of energy that can be converted into electricity and supplied to utility power grids. Wind turbines are designed to convert wind energy to electrical energy by driving an electrical generator, commonly an AC induction generator. Recently, wind turbines have received increased attention as environmentally safe and relatively inexpensive alternative energy sources. With this growing interest, considerable efforts have been made to develop wind turbines that are reliable, efficient, and have increased availability.

However, at high wind speeds or for large wind turbines, the power captured from the wind by the rotor may lead to large loads acting on mechanical components. All components necessary for transmitting the loads to the tower are exposed to these large loads. In order to transfer the load to one or more load bearing structures such as the nacelle support structure, a foot-like structure may be provided. In such a case, the foot-like structure may be coupled to the support structure using a plurality of bolts. The foot-like structure may result in uneven transfer of load to the load bearing structures. This may result in wear and tear of the components of the wind turbine.

Further, traditional designs of wind turbines, the load transferring structures attempt to distribute the stiffness through additional reinforcement structures such as ribs and reinforcements. The aforementioned designs result in additional costs and increased weight for the wind turbine. Thus, there is a need to improve the load bearing capability of the bearing housing.

SUMMARY

An aspect relates to a bearing housing which transfer the loads evenly to underlying support structures. In order to achieve the object an axially coupled bearing housing for use in a wind turbine is disclosed. The bearing housing is adapted to accommodate a bearing assembly. The bearing assembly comprises an inner ring and an outer ring. Further, the bearing housing is axially coupled to a base support structure using plurality of fastening points on the base support structure. The bearing housing may be coupled to the base support structure at multiple positions so that the load is distributed evenly to the support structures such as base plate and the tower.

In an aspect of embodiments of the invention, the bearing housing is coupled to the base support structure using a fastening means or fastener. In an instance the fastening means may include, but not limited to, a welding, bolting means or bolts and a magnetic means or magnets. The bearing housing is axially coupled to the base support structure at multiple points. The bearing assembly is housed within the bearing housing.

In another aspect of embodiments of the invention, the horizontal central axis of the bearing housing is parallel to horizontal central axis of the base support structure. In a preferred embodiment, the horizontal central axis of the bearing housing coincides with the horizontal central axis of the base support structure.

In yet another aspect of embodiments of the invention, the bearing housing is a monolithic component. The bearing housing is fabricated as a monolithic component for efficient transfer of load to the underlying support structures. In some embodiment, the bearing housing may be composed of multiple parts. For example, the bearing housing may be composed of multiple segments.

In still yet another aspect of embodiments of the invention, the plurality of fastening points are chosen such that the stress distribution to a support structure is even. In a preferred embodiment, the bearing housing may be coupled to the base support structure at equally spaced points along the circumference of the bearing housing. In some other embodiments, the bearing housing may be coupled at points which aid in transferring the load efficiently to the underlying support structures.

In some other aspects, the support structure may be at least one of a base, a tower portion and a nacelle. In some embodiments, the support structures may include reinforcing structures such as flanges, ribs and rods.

In a further aspect of embodiments of the invention, the bearing housing may be composed of at least one of cast iron, an alloy and a composite material.

In yet another aspect of embodiments of the invention, fastening means or fastener is at least one of, but not limited to, a welding, bolting means or bolt and a magnetic means or magnet. The fastening means or fastener may be selected based on one or more requirements of load transfer.

The above mentioned and other features of embodiments of the invention will now be addressed with reference to the accompanying drawings of embodiments of the present invention. The illustrated embodiments are intended to illustrate, but not limit the invention.

BRIEF DESCRIPTION

Some of the embodiments will be described in detail, with references to the following Figures, wherein like designations denote like members, wherein.

DETAILED DESCRIPTION

Figure 1:
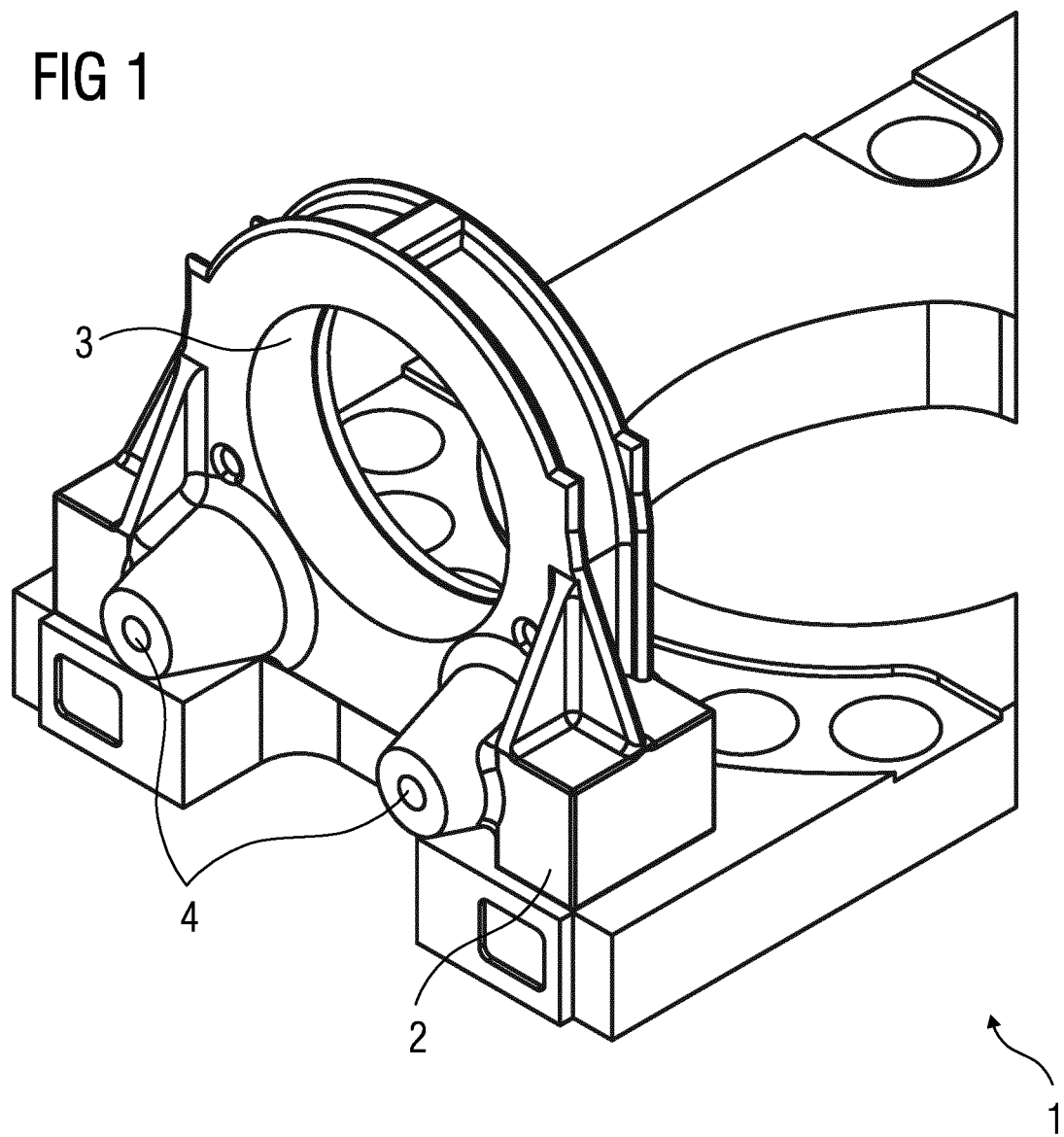
FIG. 1 illustrates a perspective view of a bearing housing, accordance with known art.

Various embodiments are described with reference to the drawings, wherein like reference numerals are used to refer like segments throughout. In the following description, for the purpose of explanation, numerous specific details are set forth in order to provide thorough understanding of one or more embodiments. It may be evident that such embodiments may be practiced without these specific details.

FIG. 1 illustrates a perspective view of a bearing housing, accordance with known art. In exemplary embodiment as shown in FIG. 1, the bearing housing 1 includes a foot portion 2 and a circular portion 3. In the circular potion 3, there may be a plurality of connecting apertures 4. The base foot portion 2 is coupled to a base plate. The base plate is configured to support the components of the wind turbine such as power train, generator and the gear box. The circular portion 3 is configured to at least partially enclose a bearing component. The bearing component may include an inner ring 7, an outer ring 8 and a plurality of spherical units disposed between the inner ring 7 and the outer ring 8. The bearing housing 1 is configured to stabilize the nacelle from the tilt and torsional loads generated due to the rotation of the blades and the wind. In the embodiment as shown in FIG. 1, the foot portion 2 is where the loads are transferred to one or more underlying support structures. Since, the foot portions 2 are at two ends of the circular portion the load is not evenly distributed to the underlying support structures. Therefore, the loads are not transferred effectively to the underlying support structures.

Figure 2:
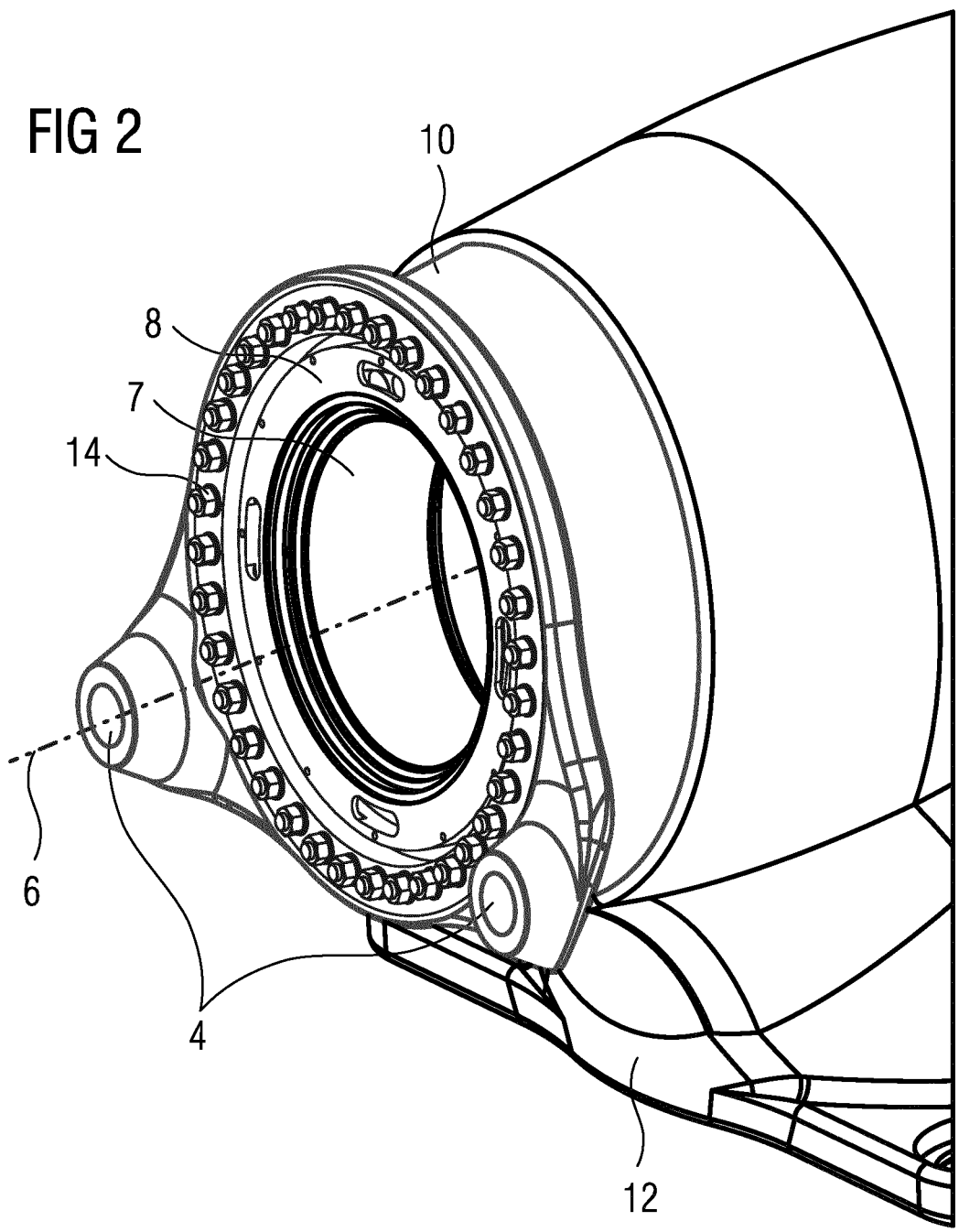
FIG. 2 illustrates a perspective view of an axially mounted bearing housing, in accordance with an embodiment.

FIG. 2 illustrates a perspective view of an axially mounted bearing housing 10, in accordance with an embodiment. As shown in FIG. 2, the bearing housing 10 is mounted axially on a base support structure 12. In a preferred embodiment, the base support structure 12 may be a bed frame structure which has a cylindrical profile. Further, the bearing housing is adapted to accommodate a bearing assembly, the bearing assembly comprising an inner ring 7 and an outer ring 8. Furthermore, the bearing housing 10 is axially coupled to the base support structure 12 using plurality of fastening points on the rim of the bearing housing 10. Further, the bearing housing 10 is coupled to the base support structure 12 using a fastening means 14. The fastening means or fastener 14 may include, but not limited to, a bolting means or bolt, a welding means or weld and a locking means or lock.

Further, as shown in FIG. 2, the horizontal central axis of the bearing housing is parallel to horizontal central axis of the base support structure 12. As the horizontal central axes 6 of the bearing housing 10 and the base support structure 12 coincide, the load is transferred evenly to the underlying support structures (not shown). The underlying support structure may include, but not limited to, a base and a tower portion. The tilt and torsional loads generated at the nacelle are transferred to the underlying support structures efficiently as the bearing housing 10 is coupled to the base support structure 12 axially. Unlike the prior art, the absence of the foot portion 2 enables the bearing housing 10 to transfer the load efficiently to the underlying support structures (not shown).

In some embodiments, the plurality of fastening points are chosen such that the stress distribution to a support structure, such as support structure 12, is even. In a preferred embodiment, the plurality of points for fastening the bearing housing 10 are spaced equidistant from each other on a rim of the bearing housing 10. Further, in the preferred embodiment, the bearing housing 10 is fastened to the support structure 12 using a bolting means 14. In some other embodiments, the plurality of fastening points may be selected for maximum load transfer. The plurality of fastening points may be distributed along the rim of the bearing housing 10 at various points. The plurality of fastening points may be chosen based on load transfer simulations performed using Computer Aided Design (CAD) software.

In some embodiment, the bearing housing 10 is composed of at least one of cast iron, an alloy and a composite material. In a preferred embodiment, the bearing housing 10 is composed of cast iron. The bearing housing 10 may be composed of composite material for a lighter, cost effective and stable structure.

In some embodiments, the bearing housing 10 may be coupled to the base support structure 12 using a fastening means 14. The fastening means or fastener 14 may be at least one of, but not limited to, a welding, bolting means or bolt and a magnetic means or magnet.

Figure 3:
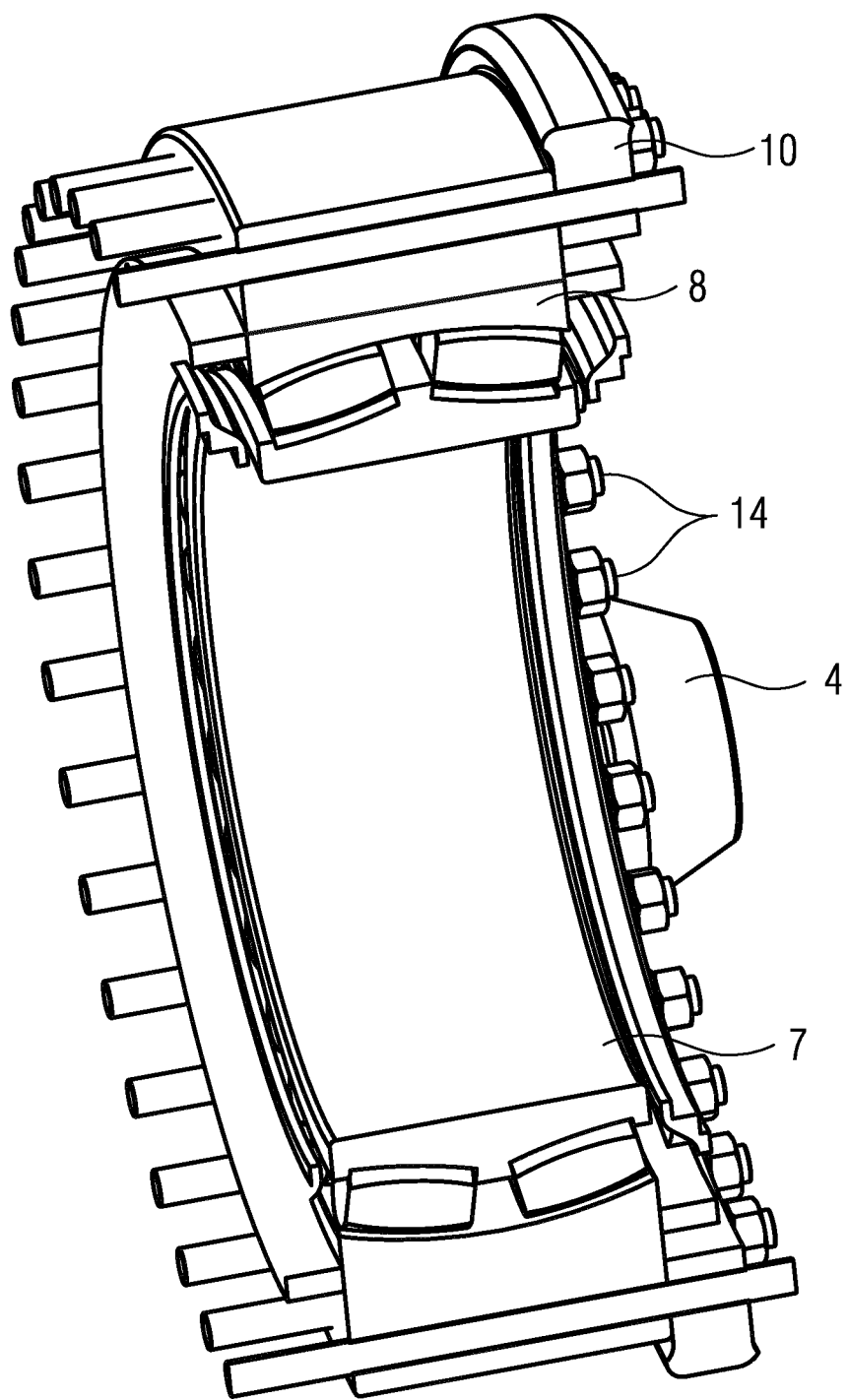
FIG. 3 illustrates a cross sectional view of an axially mounted bearing housing, in accordance with an embodiment.

FIG. 3 illustrates a cross sectional view of an axially mounted bearing housing, in accordance with an embodiment. FIG. 3 illustrates a bearing housing 10 enclosing a bearing assembly having an inner ring 7 and an outer ring 8. The bearing housing 10 includes one or more connecting aperture 4. A plurality of connecting points a selected along the circumference of a rim of the bearing housing 10. Bores may be created at the plurality of connecting points in order to accommodate the fastening means 14.

The advantageous embodiments of the bearing housing 10 disclosed herein results in efficient transfer of tilt/torsional loads from the nacelle to the underlying support structures. The axially bolted connection for the bearing housing 10 causes the load to be evenly distributed to the underlying support structures (not shown). The bearing housing 10 disclosed herein is a simplified design. The disclosed bearing housing 10 does not have a foot portion which allows the stress to be evenly distributed to the underlying support structures. Further, the bearing housing 10 does not include ribs or reinforcements which results in lesser stress concentration. The disclosed bearing housing 10 is also cost effective as some bulky parts such as foot portion 2 (see FIG. 1) are eliminated.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

I claim:

1. A bearing housing for use in a wind turbine, wherein the bearing housing is adapted to accommodate a bearing assembly, the bearing assembly comprising an inner ring and an outer ring;

wherein the bearing housing is axially coupled to a base support structure at a plurality of fastening points on a rim of the bearing housing using a plurality of fasteners, wherein the base support structure has a cylindrical profile, wherein a horizontal central axis of the bearing housing coincides with a horizontal central axis of the base support structure.

2. The bearing housing in accordance with claim 1, wherein the fasteners are at least one of a weld, a bolt and a magnet.

3. The bearing housing in accordance with claim 1, wherein the bearing housing is a monolithic component.

4. The bearing housing in accordance with claim 1, wherein the plurality of fastening points are selected such that the stress distribution to at least one underlying support structure is even.

5. The bearing housing in accordance with claim 4, wherein the underlying support structure is at least one of a base and a tower portion of the wind turbine.

6. The bearing housing in accordance with claim 1, wherein the bearing housing is composed of at least one of cast iron, an alloy and a composite material.

7. A wind turbine comprising the bearing housing in accordance with claim 1.

\* \* \* \* \*